(12) United States Patent
Kosla (10) Patent No.: US 10,798,888 B2
(45) Date of Patent: Oct. 13, 2020

(54) ADJUSTABLE HEIGHT CONNECTION DEVICE FOR WATER IRRIGATION

(71) Applicant: Leslie Kosla, Kelseyville, CA (US)

(72) Inventor: Leslie Kosla, Kelseyville, CA (US)

( * ) Notice: Subject to any disclaimer, the term of this patent is extended or adjusted under 35 U.S.C. 154(b) by 159 days.

(21) Appl. No.: 15/998,251

(22) Filed: Jul. 24, 2018

(65) Prior Publication Data

US 2020/0029514 A1 Jan. 30, 2020

(51) Int. Cl.
*A01G 25/02* (2006.01)
*B05B 15/656* (2018.01)

(52) U.S. Cl.
CPC ............ *A01G 25/02* (2013.01); *B05B 15/656* (2018.02)

(58) Field of Classification Search
CPC ...... A01G 25/02; B05B 15/62; B05B 15/622; B05B 15/625; A63B 2225/093; A61H 2201/0161; B25G 1/04; Y10T 16/540257
USPC ...................................... 239/276; 248/80–88
See application file for complete search history.

(56) References Cited

U.S. PATENT DOCUMENTS

| | | | | |
|---|---|---|---|---|
| 2,158,546 A | * | 5/1939 | Lang | A61G 21/00 248/167 |
| 2,652,218 A | * | 9/1953 | Dean | B05B 15/622 248/86 |
| 2,711,927 A | * | 6/1955 | Miller | B05B 15/622 239/276 |
| 8,286,892 B1 | * | 10/2012 | Schwanebek | B05B 15/622 239/1 |
| 2010/0025558 A1 | * | 2/2010 | Tang | E04H 12/187 248/514 |

* cited by examiner

*Primary Examiner* — Tuongminh N Pham
(74) *Attorney, Agent, or Firm* — Savantek Patent Services; Ivan E. Rozek (57) ABSTRACT

An adjustable height connection for water irrigation with a base structure, a first pipe, a second pipe and a hose attachment pipe. The first pipe telescopes into the second pipe. The second pipe is attached via a hinge member to the base structure so that it can be folded for compact storage or transport. The hose attachment pipe has a threaded inlet and outlet and is attached perpendicularly to the top of the first pipe. The first pipe includes indentations to allow a treaded locking screw to penetrate the side wall of the second pipe and engage one of the indentations of the first pipe thereby holding it in place. The base structure includes downward facing arrow shaped legs to help secure it to dirt-like ground surface.

4 Claims, 10 Drawing Sheets

ADJUSTABLE HEIGHT CONNECTION DEVICE FOR WATER IRRIGATION

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of portable water irrigation accessories and more specifically to an adjustable height connection device for water irrigation.

During the irrigation of a lawn or garden, it is sometimes necessary to direct water from a raised perspective of three or more feet, down onto a garden or lawn. To this end, some manufactures have designed and sold pole type systems that are forced into the ground and which have a sprinkler head on the top of the pole to water the surrounding area. One such device is the "Hi-Rise Lifetime Sprinkler" available from GardenersSupply.com.

However, there are deficiencies in the prior technology. First, the pole must be inserted to a significant depth, which can be problematic in hard soil and can disfigure a lawn. Second, the height of the sprinkler head is not easily adjustable so that it can be fixed at a desired height without excessive tightening of a thumb screw. Third, existing daisy-chain hose connecting systems usually occur at ground level and cannot easily daisy chain at a raised level of two or more feet. Finally, existing adjustable height raised pole sprinkler systems deliver water from their base and sent the water up the center of the pole to a sprinkler head mounted to the top of the pole. This design necessitates the use of precision O rings and expensive precision internal tolerances between the lower pole and the slidable upper pole.

BRIEF SUMMARY OF THE INVENTION

The primary object of the invention is to provide an adjustable height connection device for attaching water irrigation devices.

Another object of the invention is to provide a height adjustable device that supports itself stably on a dirt surface without needing to excessively penetrate the surface Another object of the invention is to provide a height adjustable device that device that includes a garden hose male threaded end on one side and a garden hose female threaded end on the opposite side to allow for a daisy-chain effect when needed.

A further object of the invention is to provide a height adjustable device that is hinged for compact storage and shipping.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an adjustable height connection for water irrigation comprising: a base structure, a first pipe, a second pipe, a hose attachment pipe, a pipe hinge member half, a base hinge member half, a hinge closure assembly, a height adjustment thumb screw, said first pipe slidably telescoping into said second pipe, said first pipe terminating at its upper end perpendicularly to said hose attachment pipe, said second pipe terminating at its lower end in said pipe hinge member half, said base structure formed by flat rigid horizontally disposed leg members to form a T shaped support including a long member and a short member, each leg of said T shaped support including a downwardly facing arrow shaped tip, said base hinge member half fixedly attached to the upper surface of said base structure where the long and short members of said T shaped support intersect, said pipe hinge member half rotatably engaging said base hinge member half via a common shaft, said first pipe's side surface including a plurality of evenly and vertically spaced indentations, said second pipe having a threaded aperture near its top end, said height adjustment screw threaded into said threaded pipe aperture and engaging one of the said indentations of said first pipe thereby adjusting and fixing the height of said first pipe and said attached hose attachment pipe, said hose attachment pipe including a female hose thread on one end and a male hose thread on the opposite end and said hinge closure halves capable of being secured by said hinge closure assembly enabling said second pipe to be either secured in a vertical position or a horizontal position.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
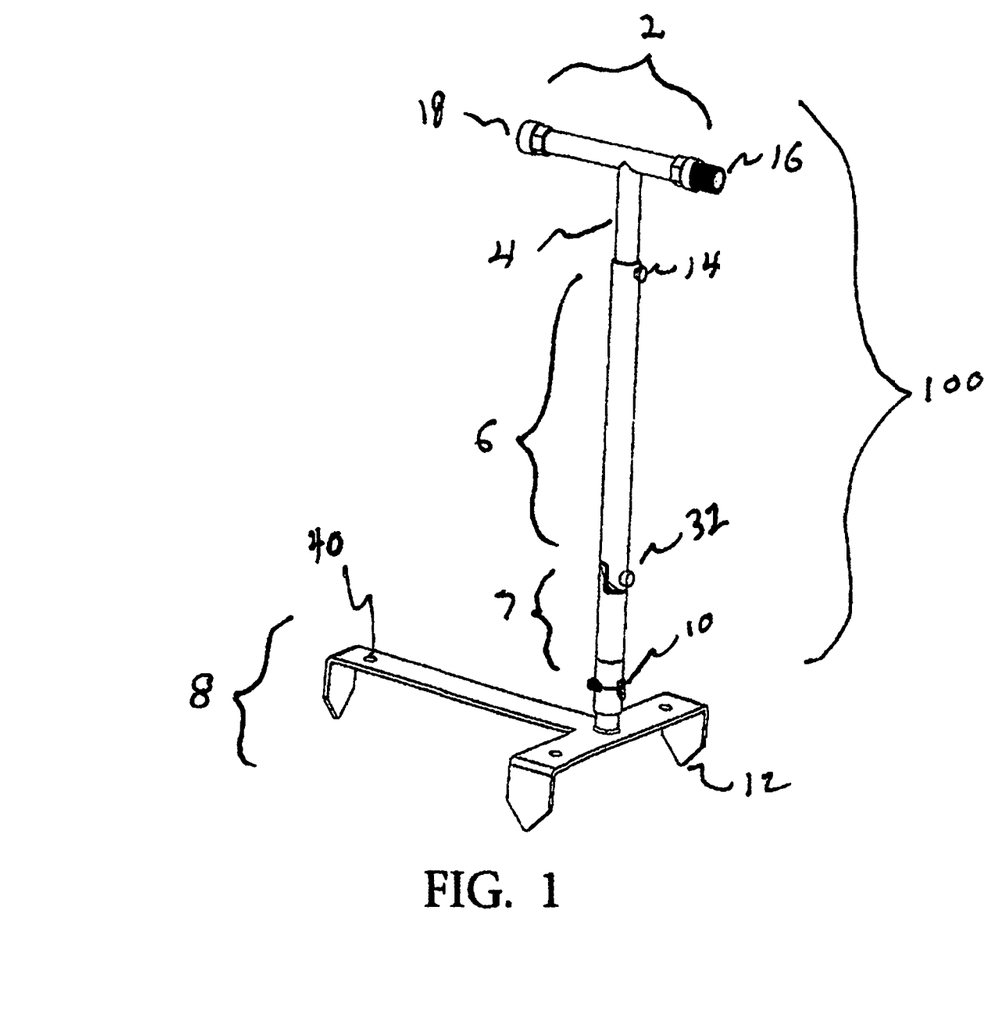
FIG. 1 is a perspective view of the invention.

Referring now to FIG. 1 we see a perspective view of the invention 100. A T shaped support base 8 includes downwardly facing arrow shaped members 12 that can be pushed into dirt or grass associated with a garden or lawn area. The T shape creates a sturdy support structure without needing to insert a support pole deep into the ground, which can be difficult if the ground is hard, and can also disfigure a lawn area. A first pipe 4 terminates at its top end in a perpendicularly disposed garden hose attachment pipe 2 having a male threaded portion 18 on one end and a female threaded portion 16 on the opposite end. A garden hose can be connected to one end, and a sprinkler device can be connected to the opposite end. Alternately, a T shaped pipe fitting can be attached to one end of hose attachment pipe 2 so that a plurality of garden hoses can be daisy chained together from one irrigation support to the next. The first pipe 4 slidably telescopes into a second pipe 6. Second pipe 6 terminates at pivot joint 32. The lower end of lockable pivot joint 32 is connected to a third pipe 7 which is in turn connected to hinge assembly 10. First pipe 4 includes a plurality of indentations 22, shown in FIGS. 2, 4, 8, that can correspond with thumb screw 14 thereby allowing the first pipe 4 to remain at the desired height without needing to excessively tighten thumb screw 14.

Figure 2:
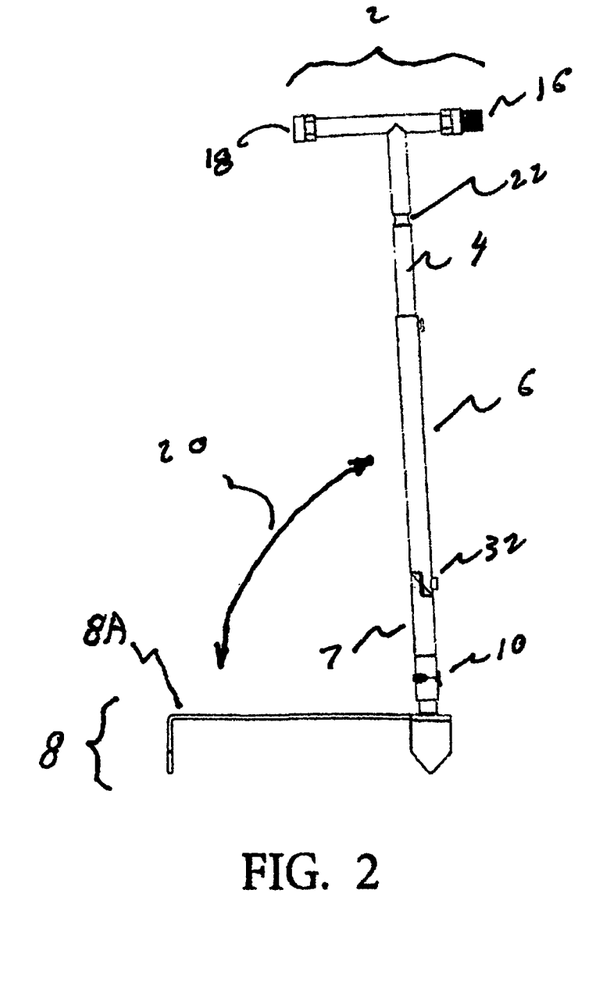
FIG. 2 is a side view of the invention with the first pipe raised.

FIG. 2 is a side view of the invention. Experiments have shown that if the second pipe 6 is in an approximately eighty-eight-degree orientation with the base 8 as shown by radial arrow 20, the water pressure exerted when a hose is attached to side 18 of the water pipe 2 will be less likely to cause the base 8 to lift up at point 8A thereby making the entire assembly 100 less likely to fall forward during use.

Figure 3:
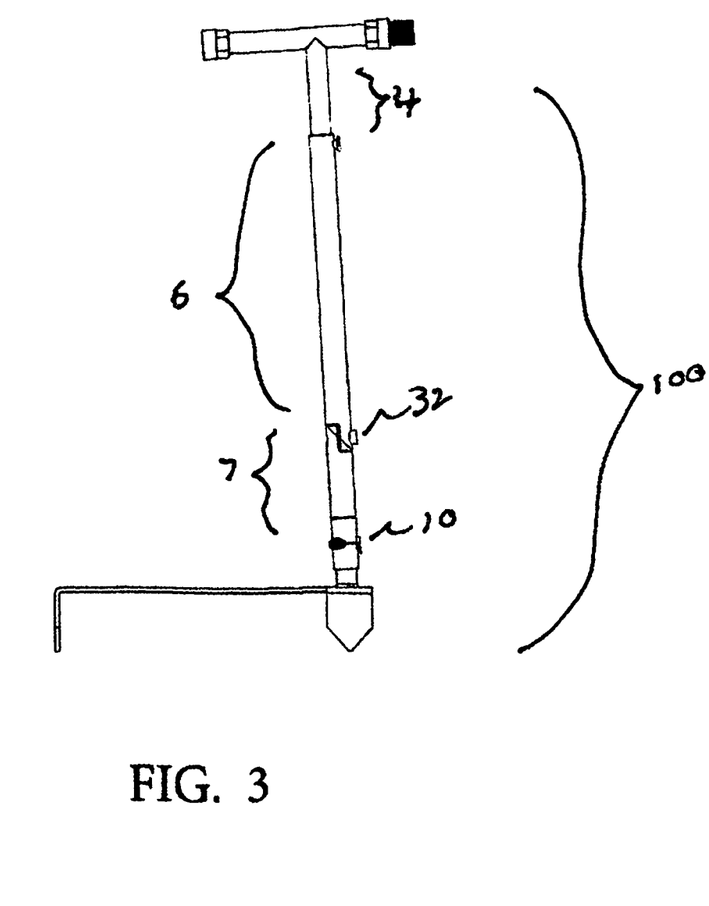
FIG. 3 is a side view of the invention with the first pipe lowered.

FIG. 3 is a side view of the invention. The user has the option to extend or retract pipe 4 as needed by loosening thumb screw 14 and tightening it again when the desired height is reached.

Figure 4:
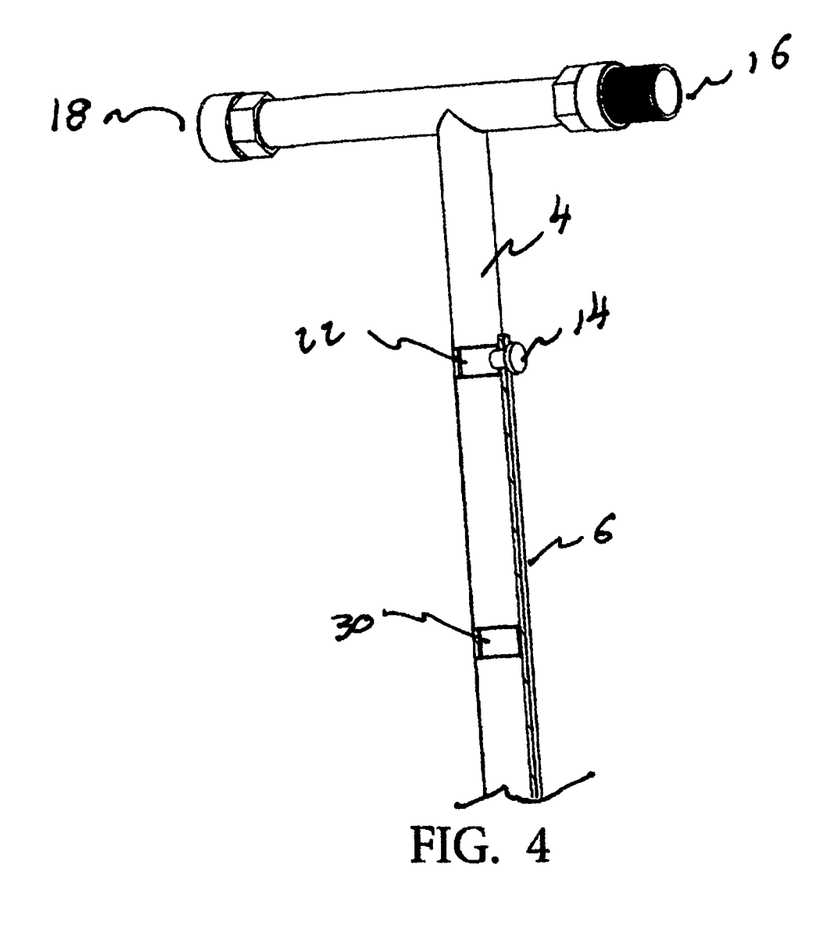
FIG. 4 is a partial section view showing the locking mechanism.

FIG. 4 is a partial section view showing how the thumb screw 14 has engaged the depressed area 22 of first pipe 4. Additional depressions 30 are evenly spaced approximately every two inches along the length of first pipe 4 allowing for a variety of selected heights.

Figure 5:
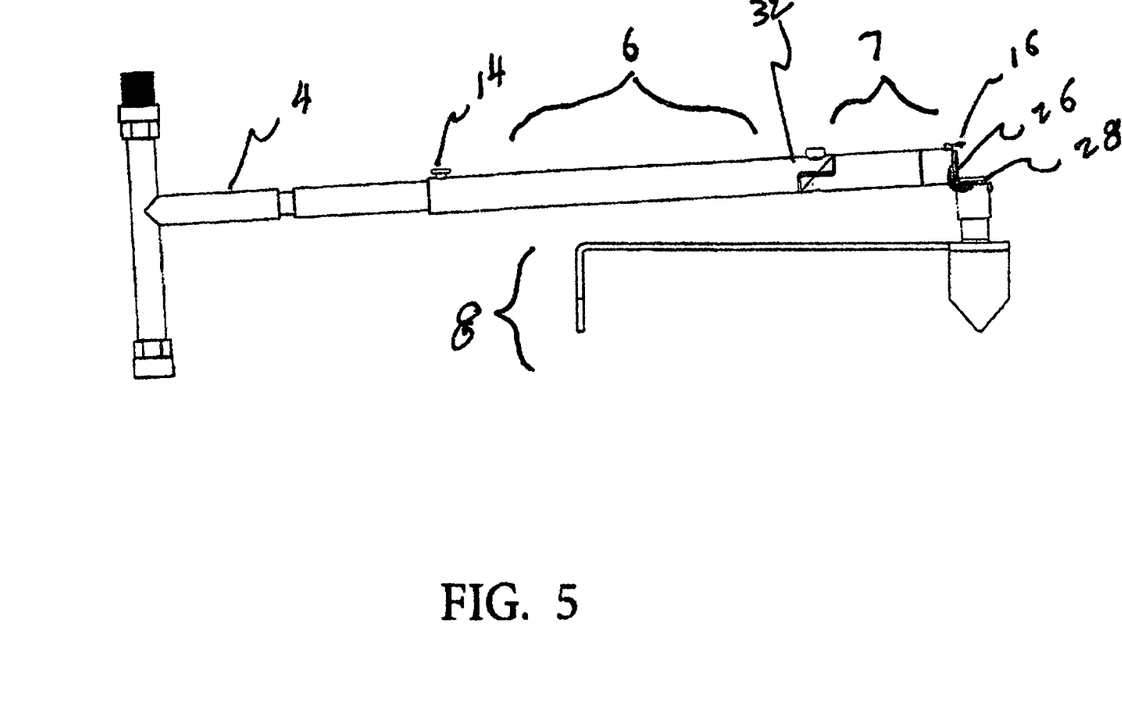
FIG. 5 is a side view of the invention in the folded position.

FIG. 5 is a side view of the invention 100 in the folded position which is ideal for storage or transport. Hinge assembly 10 includes an upper hinge half 26, a lower hinge half 28, a hinge pin 24 and a latch 16.

Figure 6:
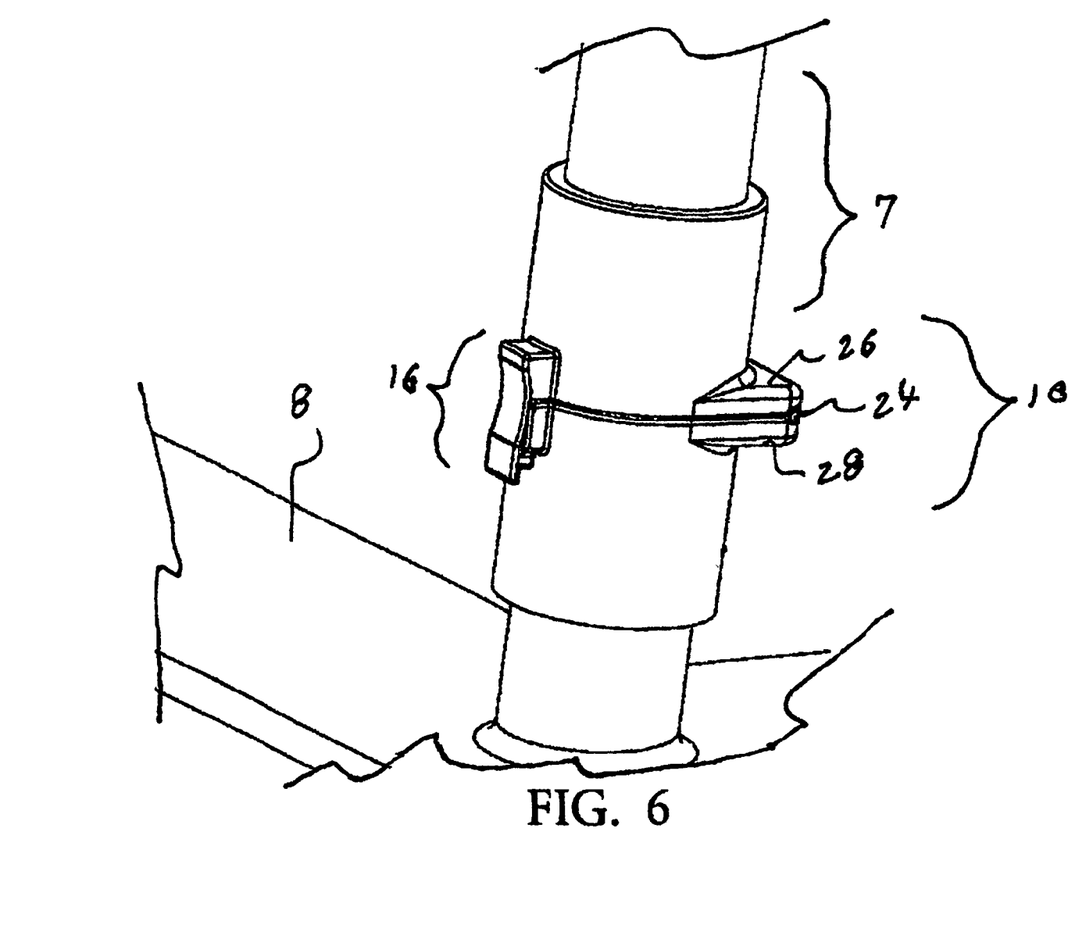
FIG. 6 is a perspective view of the hinge assembly in the locked position.

FIG. 6 is a partial perspective view showing the third pipe 7 fitted into the upper half of the hinge assembly 10, wherein the hinge assembly is shown in the closed and locked position. Hinge halves 26, 28 are closely abutted to each other and latch assembly 16 is locking the upper half of the hinge assembly 10 to the lower half of the hinge assembly 10.

Figure 7:
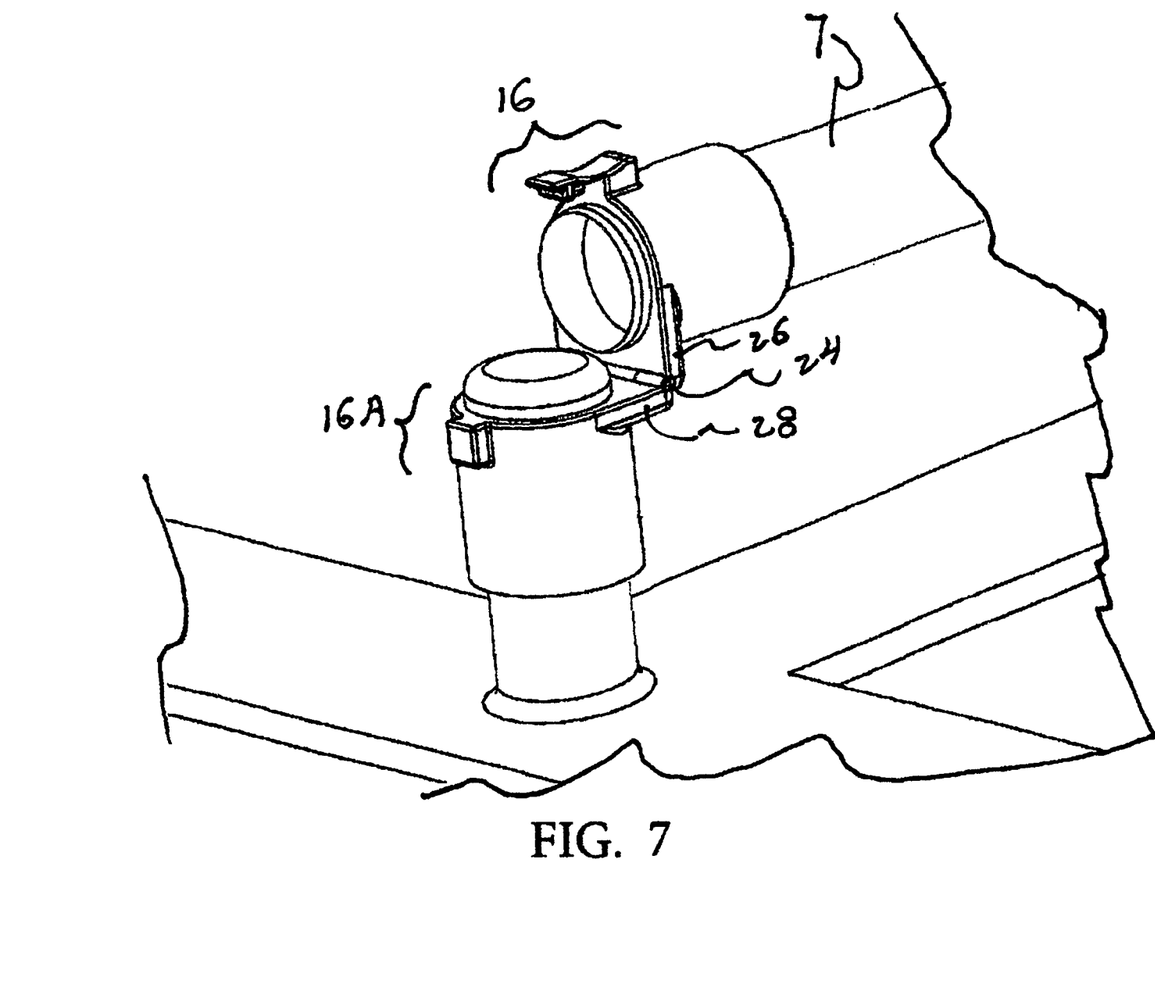
FIG. 7 is a perspective view of the hinge assembly in the unlocked position.

FIG. 7 is a partial perspective view showing the hinge assembly 10 in the open position. Latch 16 has been disconnected from mating latch portion 16A located on lower half of the hinge assembly 10.

Figure 8:
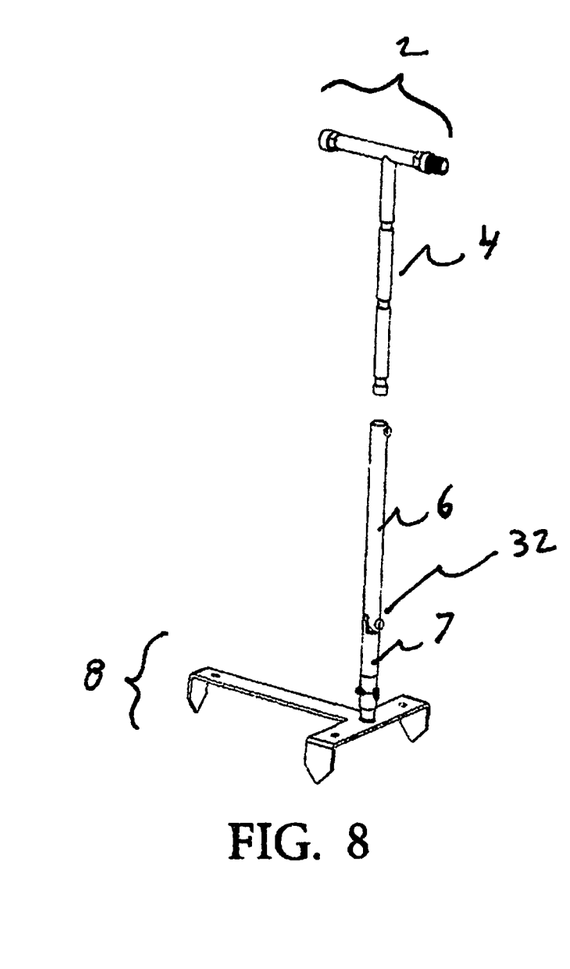
FIG. 8 is a perspective view with the first pipe removed to be used as a handle.

FIG. 8 is a perspective view of the invention 100 with the first pipe 4 fully removed from second pipe 6. This configuration allows the user to use pipe 4 as a handle when wanting to use the sprinkler attachment 2 independently of the rest of the assembly 6, 8.

Figure 9:
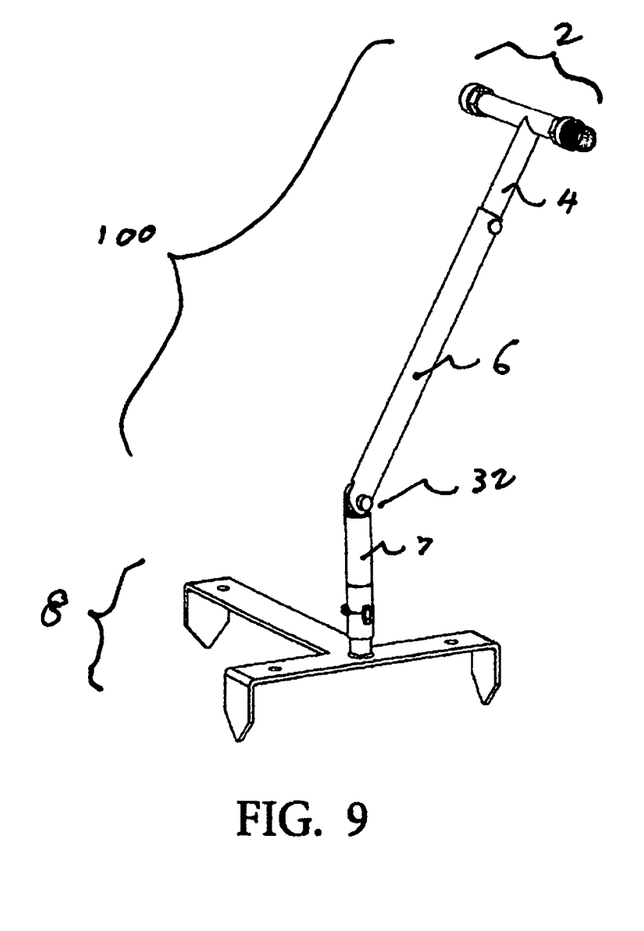
FIG. 9 is a perspective view of the invention with the second pipe pivoted to an angled position.

FIG. 9 is a perspective view of the invention 10 with second pipe 6 in an angled position via pivot assembly 32. This allows the user a further adjustment method for positioning the garden hose attachment, and sprinkler attachment pipe 2.

Figure 10:
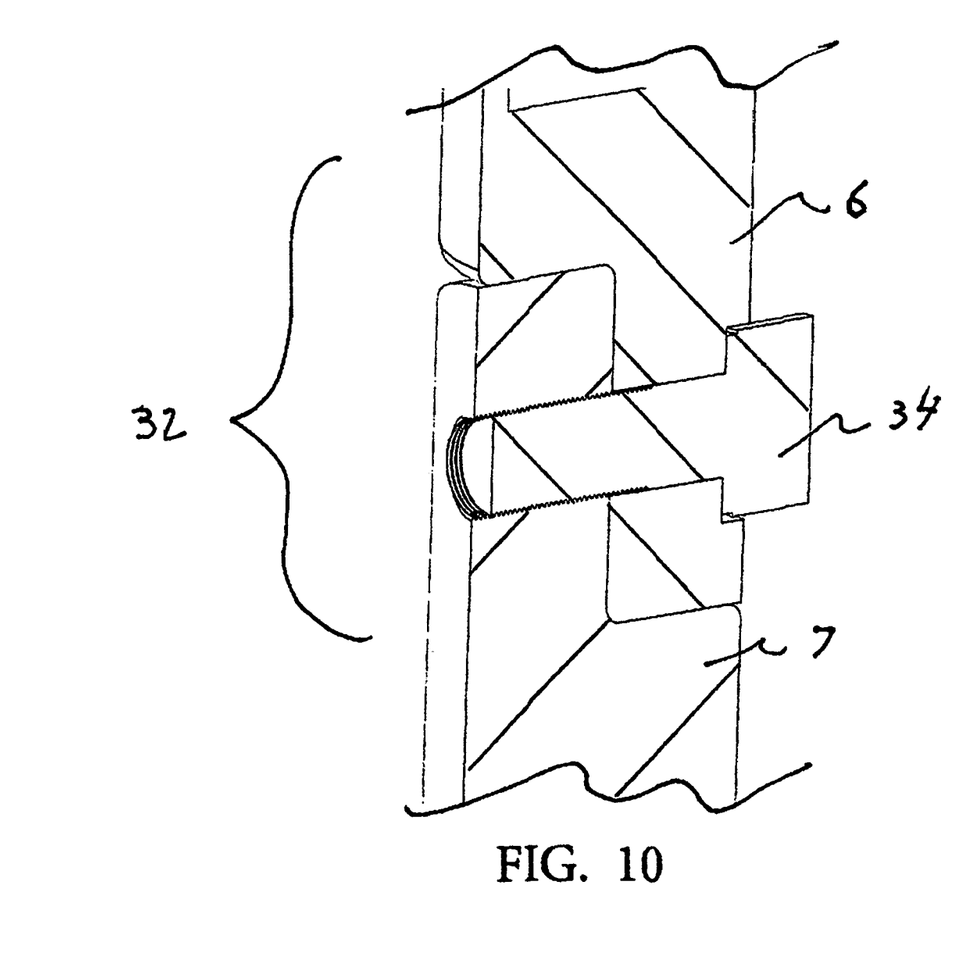
FIG. 10 is a partial section view of the pivot assembly.

FIG. 10 is a partial section view showing a detail of lockable pivot assembly 32. Locking screw 34 is threadably attached to third pipe 7 allowing second pipe 6 to rotate about screw 34. The user can loosen screw 34 to adjust the angle of second pipe 6 and then tighten it to lock second pipe 6 to the desired angle.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An adjustable height connection for water irrigation comprising:
    a base structure;
    a first pipe;
    a second pipe;
    a third pipe;
    a hose attachment pipe;
    a lockable pivot;
    a pipe hinge member half;
    a base hinge member half;
    a hinge closure assembly;
    a height adjustment thumb screw;
    said first pipe slidably telescoping into said second pipe;
    said first pipe terminating at an upper end of said first pipe perpendicularly to said hose attachment pipe;
    said second pipe terminating at a lower distal end of said second pipe in said lockable pivot;
    said third pipe terminating at an upper end of said third pipe in said lockable pivot;
    said third pipe terminating at a lower end of said third pipe in said pipe hinge member half;
    said base structure formed by a flat T shaped support including a long member and a short member;
    each leg of said T shaped support including a downwardly facing arrow shaped tip;
    said base hinge member half fixedly attached to an upper surface of said base structure where the long and short members of said T shaped support are joined;
    said pipe hinge member half engaging said base hinge member half via a common pivot shaft;
    a side surface of said first pipe including a plurality of evenly spaced indentations;
    said second pipe comprising an upper distal end and the lower distal end, wherein the second pipe further comprises a threaded aperture at the upper distal end of said second pipe;
    said height adjustment screw threaded into said threaded aperture and engaging one of said indentations of said first pipe thereby adjusting and fixing the height of said first pipe and said attached hose attachment pipe;
    said hose attachment pipe including a female hose thread on one side and a male hose thread on the opposite side; and
    said pipe hinge member half and said base hinge member half capable of being secured by said hinge closure assembly enabling said second pipe to be either secured in a vertical position or in a horizontal position.

2. An adjustable height connection for water irrigation as claimed in claim 1 wherein said arrow shaped tips of said base structure are three inches long and can be forced down to penetrate a grass and dirt substrate.

3. An adjustable height connection for water irrigation as claimed in claim 1 wherein said second pipe is in an eighty-eight degree relationship with said long member of said T shaped support.

4. An adjustable height connection for water irrigation as claimed in claim 1 wherein the lockable pivot is integrated with said second pipe allowing said second pipe to be tilted and locked at a desirable angle relationship with said long member of said T shaped support.

* * * * *